Dec. 29, 1964   G. W. IRWIN ETAL   3,163,263
TURRET LOCKING MECHANISM
Filed Dec. 23, 1960   5 Sheets-Sheet 2
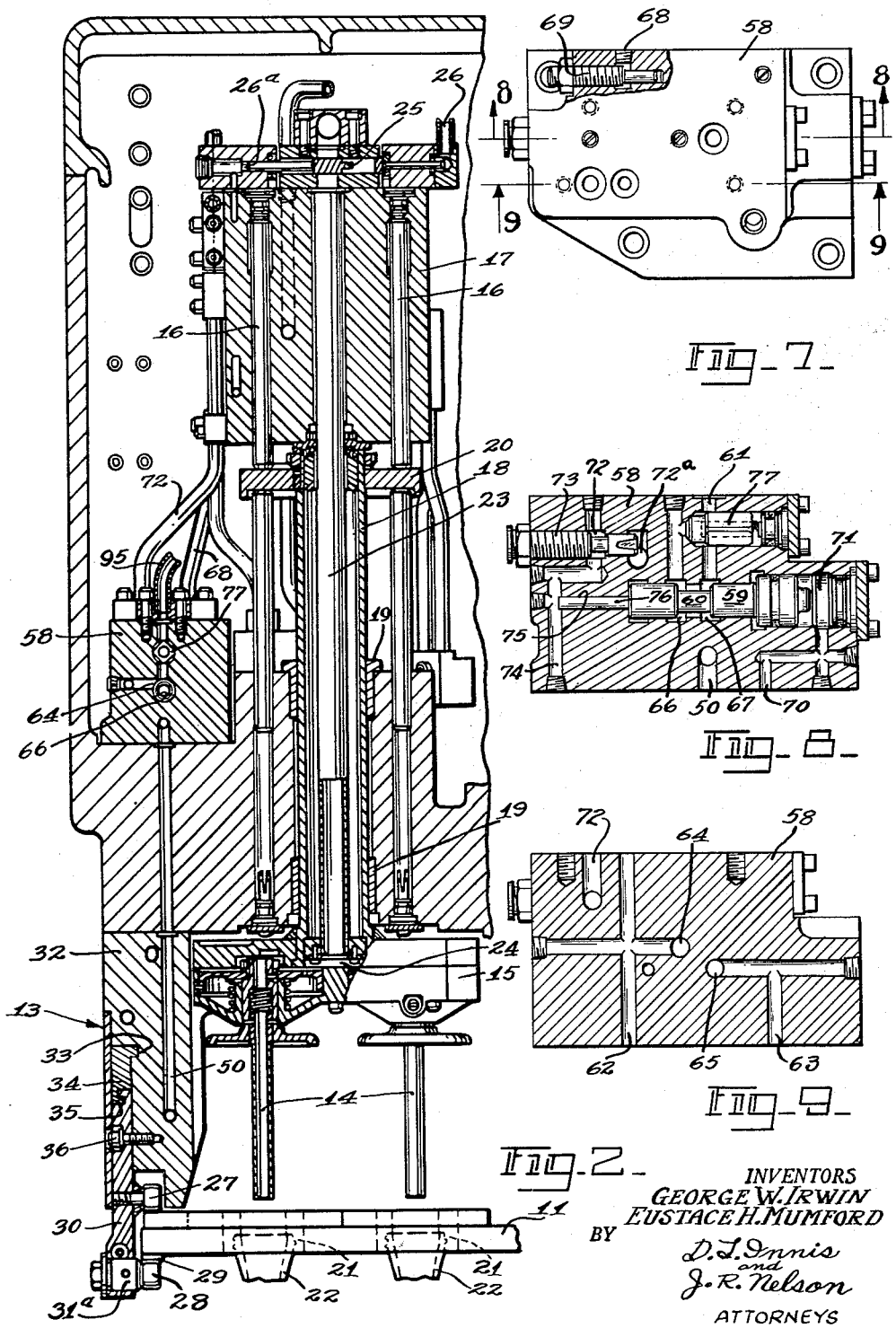
INVENTORS
GEORGE W. IRWIN
EUSTACE H. MUMFORD
BY
D. L. Innis
and
J. R. Nelson
ATTORNEYS

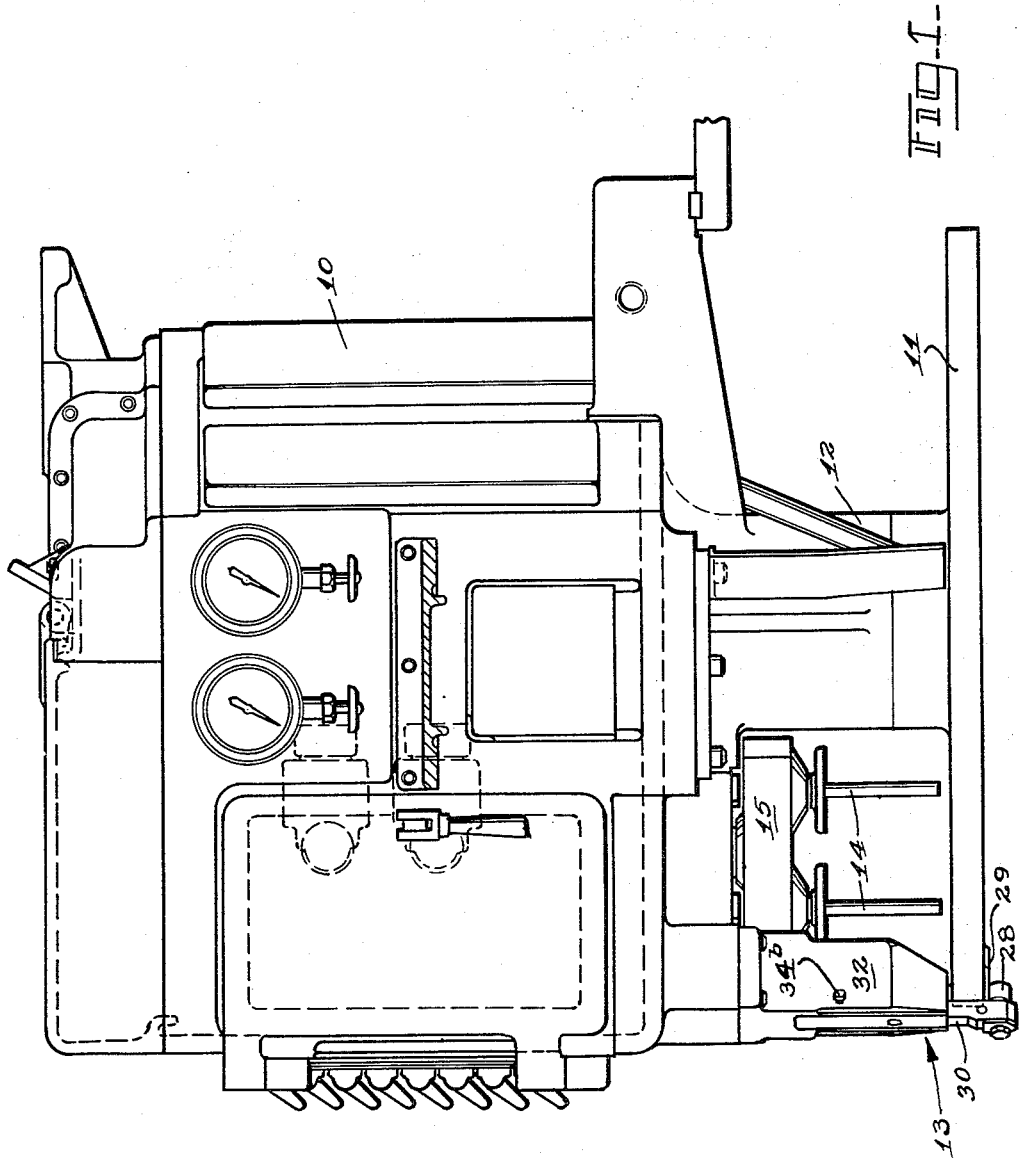

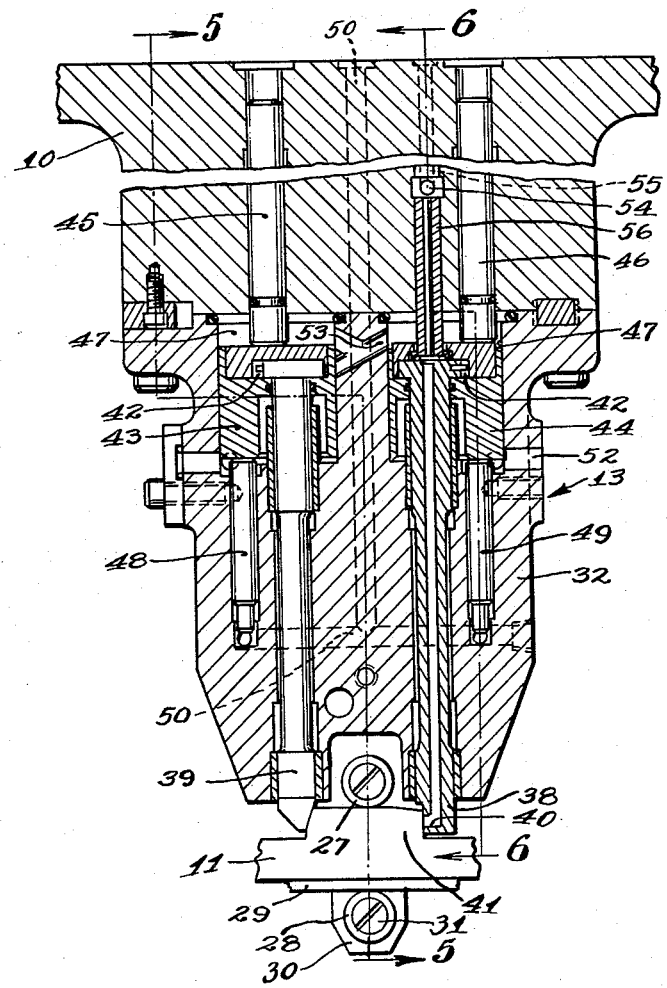

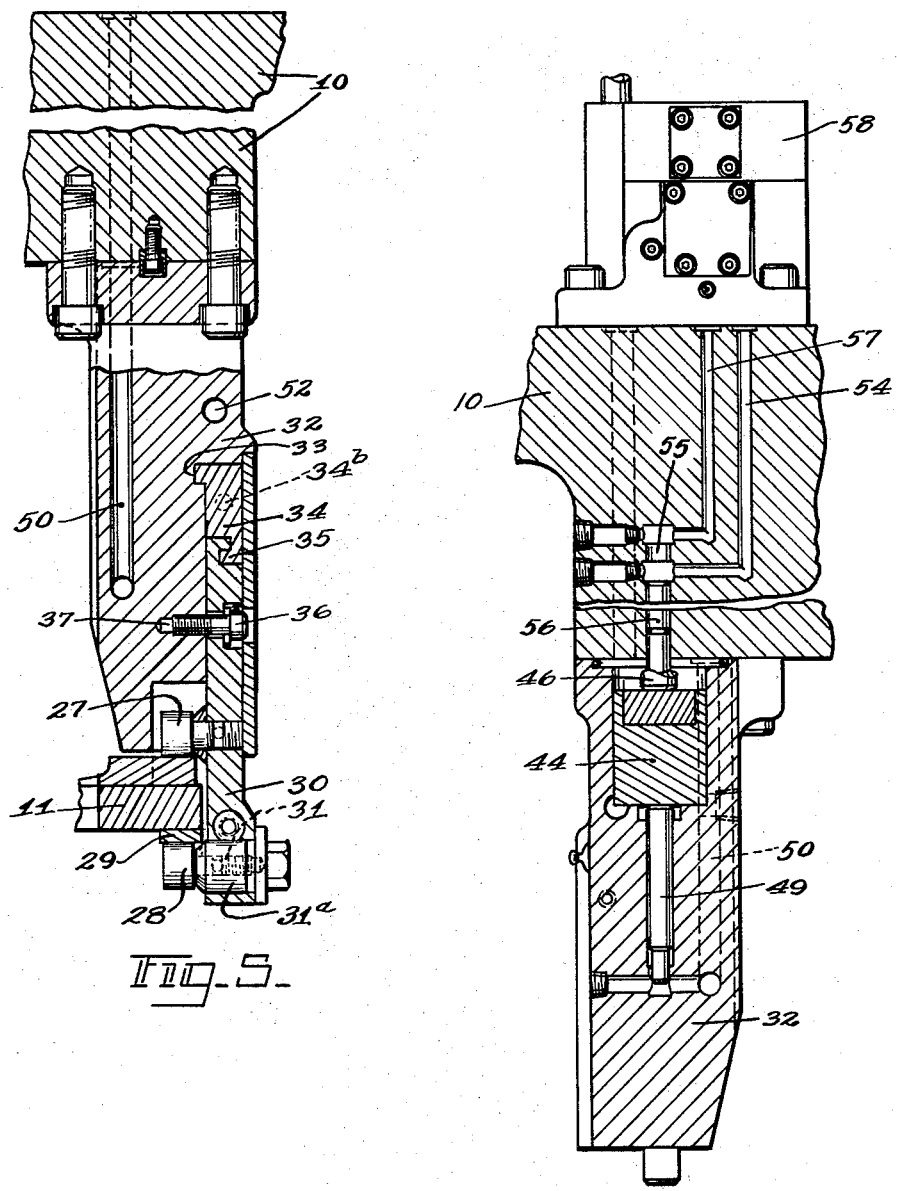

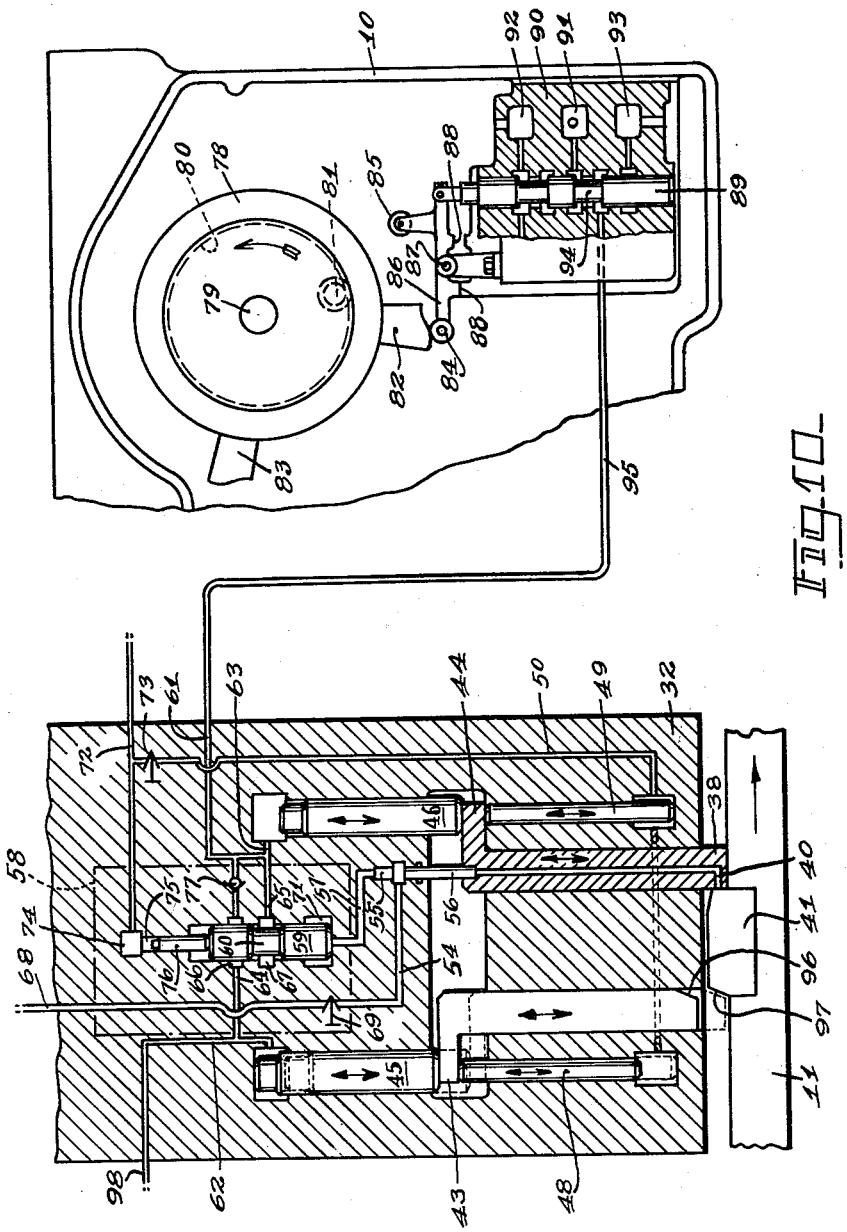

United States Patent Office 3,163,263
Patented Dec. 29, 1964

3,163,263
TURRET LOCKING MECHANISM
George W. Irwin, Holland, Ohio, and Eustace H. Mumford, Ottawa Lake, Mich., assignors to Owens-Illinois Glass Company, a corporation of Ohio
Filed Dec. 23, 1960, Ser. No. 77,900
13 Claims. (Cl. 188—151)

This invention relates to an apparatus for sensing the movement of a machine part into a registration position and for locking said machine part when in registered position.

More particularly, this invention relates to apparatus for locking a neck mold carrying turret in a predetermined relationship with respect to a glassware forming machine.

In the operation of a glass forming machine of the type wherein neck rings or molds are transported from station to station, it is essential that the transporting means index so as to locate the neck molds successively in predetermined locations. This is particularly necessary where various forming operations take place at these locations. While the drive mechanism utilized for indexing the neck mold carrier will bring the neck molds into approximate position, there are slight tolerances within the indexing mechanism which prevent exact and precise positioning of the neck molds in the forming stations. Therefore it is necessary to provide apparatus for insuring that the neck molds are precisely located and to lock the turret or neck mold carrier at the various forming stations. This is particularly necessary at the pressing station wherein shaping plungers, carried by the machine, are moved through the neck molds.

Therefore it is an object of this invention to provide apparatus for registering and locking an indexing turret in a predetermined position relative to the forming mechanism.

It is a further object of this invention to provide an apparatus responsive to the approach of the neck molds into position for actuating the locking device for locking the turret and neck molds in a precise position.

It is a still further object of this invention to provide a fluid actuated mechanism for sensing the arrival of a moving member to a particular position and for locking said member at said particular position.

FIG. 1 is a schematic elevational view of the upper portion of the glass forming machine.

FIG. 2 is a schematic vertical cross-section through the blow station of the glass forming machine.

FIG. 3 is a top plan view of the stop and lock mechanism of this invention.

FIG. 4 is a vertical cross-sectional view of the stop and lock mechanism in its fully locked position.

FIG. 5 is a vertical cross-sectional view taken along line 5—5 of FIG. 4.

FIG. 6 is a vertical cross-sectional view taken along line 6—6 of FIG. 4.

FIG. 7 is a top plan view of the pilot valve assembly.

FIG. 8 is a sectional elevation taken at line 8—8 on FIG. 7.

FIG. 9 is a cross-sectional view taken at line 9—9 on FIG. 7.

FIG. 10 is a schematic hydraulic circuit diagram of the stop and lock mechanism of the invention.

Referring specifically to FIG. 1, there is shown an upper machine housing 10 which contains the main timing system and drive unit for a turret 11. The turret 11 is located beneath the housing and the turret shaft is rotatably supported within a downwardly extending hollow sleeve member 12. The drive mechanism which is contained within the upper housing 10 is of the type which will index the turret 11 in the same direction in steps of 120°. The details of this mechanism do not form any part of this invention.

The detailed description of this drive mechanism is set forth in copending application Ser. No. 806,957, filed April 16, 1959, and owned by the assignee of this application.

When the turret 11 is indexed, it is necessary that it be stopped and held in a predetermined position so that the neck molds, carried by the turret, are always positioned at three stations of the machine.

As specifically shown on FIG. 1, a stop and lock mechanism generally designated 13, is connected to the underside of the upper housing 10 and extends vertically downward adjacent the outer peripheral surface of the turret 11. The stop and lock mechanism 13, for purposes of illustration, is shown positioned adjacent the blow station where a pair of blow heads 14 are adapted to be vertically displaced into cooperative relationship with respect to the neck molds located at the blowing station.

It should be pointed out that the specific location of the stop and lock mechanism is optional but that it has the additional function of providing vertical support for the turret, thus there is some advantage to its being located at one of the forming stations.

Referring to FIG. 2 which is a vertical section through the blow station, the blow heads 14 are shown connected together at their upper ends by a moveable header 15. The header 15 is adapted to be moved downward by means of a pair of pistons 16 which are adapted to reciprocate in an upper casting 17 supported within the upper housing 10. As can readily be seen from FIG. 2, the moveable header 15 is supported at the lower end of an elongated cylindrical member 18 which is guided and restricted to vertical motion by sleeve bearing 19 contained within the lower portion of the upper housing 10. The upper end of the cylindrical member 18 carries a crosshead 20 against the upper surface of which the piston 16 will bear and thus affect downward movement of the header 15. When the header 15 is moved downward, the blow heads 14 will project through neck molds 21 and extend into the parisons 22 (portions of which are shown on FIG. 2). Air under pressure for expanding the parisons is guided downward through the interior of the cylindrical member 18 by means of a tube 23 which is adapted to telescope within the casing 17. The lower end of the tube 23 extends through the cylindrical member 18 where it is connected to the movable header 15 and thus opens into a chamber 24 provided therein. Air under pressure will flow from the chamber 24 out through the blow heads 14. The introduction of air into the tube 23 is controlled by a hydraulically actuated valve 25. The valve 25 is actuated by the introduction of oil under pressure through a conduit 26, with the opposite end of the valve 25 being biased toward the right by a hydraulic spring 26a. The introduction of oil for moving the valve 25 is under the control of a main timer, not shown, which is contained within the upper housing 10.

In order to insure that the turret 11 is properly positioned at the blow station and consequently properly positioned at the other two stations, namely the pressing station and the takeout station, the stop and lock mechanism 13 is adapted to be actuated to retain the turret 11 in a precisely predetermined relationship with respect to the various stations. Not only is it important that the turret 11 be retained with the neck molds on a precise radius, it is also important that the turret 11 does not deflect and to prevent such deflection, the stop and lock mechanism 13 is provided with a pair of rollers 27 and 28 which will support the outer peripheral edge of the turret 11 when it is "in station."

The roller 28, as shown in FIGS. 2, 4, and 5, serves as a support member upon which a bearing plate 29, attached to the under surface of the turret 11 adjacent its outer periphery, is adapted to bear. The roller 28 is attached to a vertically extending support plate 30. The roller 28 is mounted to rotate on a horizontally extending shaft 31 which in turn is threaded into a rotatable bearing member 31a. The bearing member 31a is held within the opening in the bottom of the plate 30. The axis of the shaft 31 is slightly displaced from the horizontal axis of the bearing member 31a whereby rotation of the bearing member 31a will result in vertically shifting the axis of the shaft 31. This shifting provides adjustment of the spacing between the two rollers 27 and 28. The support plate 30 also carries the roller 27 which is adapted to overlie the top surface of the turret 11 and thus confine the turret to a fixed horizontal plane. The support plate 30 is adjustably attached (see FIG. 5) to a casting 32 which forms the main body portion of the stop and lock mechanism 13. The casting 32 has a horizontal guide slot 33 in its outside face within which a block 34 is adapted to slide horizontally. The lower portion of the block 34 is provided with a horizontally tapered interlock 35 which is cooperable with the upper end of the support plate 30. A locking screw 36 extends through an enlarged opening in the support plate 30 and is threadedly received within a threaded opening 37 in the casting 32. Vertical adjustment of the rollers 27 and 28 may be affected by horizontally moving the block 34 in the guide slot 33 by means of screws 34b which thread through opposite sides of casting 32 and abut the block at opposite ends thereof, resulting in raising and lowering of the support plate 30. After the required adjustment has been made, the locking screw 36 may be tightened and the screws 34b tightened against the ends of block 34 to lock the support plate 30 in its adjusted position with respect to the casting 32.

Referring now to FIGS. 3 and 4, there is shown the details of the stop and lock mechanism 13. As can readily be seen, the casting 32 has two downwardly projecting portions thereof which extend on either side of the roller 27. Within these extending portions there are provided a position sensing element 38 and a locking member 39. Both the sensing element 38 and the lock member 39 are mounted for vertical movement within the casting 32. The position sensing element is in the form of an annular piston member having a side opening 40 adjacent its lower end which is adapted to be positioned in the path of a stop block 41 carried on the upper surface of the turret 11. During the initial indexing movement of the turret 11, both the position sensing element 38 and the locking member 39 are retracted within the casting 32. The upper ends of both the position sensing element 38 and the locking member 39 have external flanges which seat within chambers 42 which in turn are formed within a pair of guide blocks 43 and 44. The guide blocks 43 and 44 loosely retain the upper end of the locking member 39 and the sensing element 38 respectively against vertical motion relative to said blocks, but allow limited rotation of said element 38 and lock 39 relative to said blocks.

Positioned above and extending through the lower portion of the housing 10 is a piston 45 whose lower end abuts the upper surface of the guide block 43. Similarly a piston 46 extends through an opening in the lower portion of the housing 10 and its lower end abuts the upper surface of the guide block 44.

As can be seen in FIG. 4, the guiding blocks 43 and 44 are free to move vertically within openings 47 formed at the upper end of the casting 32. A second pair of pistons 48 and 49 are positioned within cylindrical openings in the casting 32 so as to have their top faces in abutting relationship with the under surface of the guide blocks 43 and 44. The pistons 48 and 49 are constantly forced against the under surface of the blocks 43 and 44 by the introduction of oil under pressure through the passageway 50 which extends down through both the bottom portion of the housing 10 and the casting 32 to open at the lower end of the pistons 48 and 49. By constantly biasing these pistons in the up direction, the positioning of the position sensing element 38 and the locking member 39 may be controlled by the selective introduction of pressure to the down pistons 45 and 46 and the selective exhaust of pressure therefrom.

In order to insure that any leakage of oil past the pistons 45 or 46 or the pistons 48 and 49 will not travel down the sides of the position sensing element 38 or the locking member 39, hardened steel sleeves 51 surround the upper portions of the element 38 and member 39 so as to provide a leak-proof annular chamber of some depth surrounding the area where the element 38 and member 39 extend through the casting 32. This excess oil which may leak past the pistons will be discharged through an opening 52 formed in the side of the casting 32.

Inasmuch as the two guide blocks 43 and 44 will move upward upon the exhaust of fluid from the tops of the two pistons 45 and 46, a passageway 53 is provided to connect the upper portions of the openings 47 within which these blocks ride to prevent any pressure inequality which might be present therebetween. In the normal operation of the stop and lock device, fluid under pressure will be introduced about the piston 46 first and as the sensing element 38 moves downward, relative low pressure air will be fed through position sensing element 38 and out through the side opening 40. This air is introduced from above through a passageway 54 as best shown in FIG. 6. The passageway 54 opens into the side of a vertical passageway 55 formed in the bottom of the housing 10. A tubular element 56 is adapted to telescope within the passageway 55. The lower end of the tubular element 56 is connected to the guide blocks 44 and provides a conduit through which air, introduced through the passageway 54, may reach the side opening 40 in the sensing element 38. As long as the element 38 is in its extended position, that is with its end down and in the path of travel of the stop block 41, the upper end of the tubular element 56 will be below the junction point of the air inlet passage 54 and the vertical passage 55.

However, upon retraction of the element 38, the tubular element 56 will be telescoped up into the passage 55 and will effectively cut off the supply of air from the passage 54. The upper end of the passage 55 is open to a passage 57 (FIG. 6) extending vertically through the bottom portion of the housing 10. The passageways 54, 57 and 50 and the upper ends of the cylindrical passages which contain the pistons 45 and 46 all open through the top surface of the bottom of the housing 10. Mounted above these openings and in communication therewith is a pilot valve assembly 58 which functions to control the introduction of oil under pressure above the two pistons 45 and 46 and the exhaust of fluid therefrom.

Referring now to FIGS. 7 to 9, there is shown the details of the pilot valve assembly 58. In essence, the pilot valve assembly 58 comprises a metallic block having a plurality of passageways therethrough and containing a piston operated spool valve 59. The spool valve 59 has an undercut portion 60 which regulates the flow of oil, introduced through a passageway 61, to the ports 62 and 63 which are axially aligned with the chambers in which pistons 45 and 46 operate.

With particular reference to FIGS. 8 and 9, oil entering the passageway 61 will flow into an annular chamber 67 and then by the undercut portion 60 of the spool valve 59, when in the position shown, and into a second annular chamber 66. The spool valve 59 will normally be positioned to the right, as viewed in FIG. 8, thus the oil inlet passageway 61 is connected to the annular chamber 67 and by way of the passageway 65 to the outlet port 63 while oil is prevented from reaching the annular chamber 66. The spool valve 59 is moved to the position shown in FIG. 8 when the opening 40 in the position sensing element 38 is blocked by the approach of the stop block 41.

Air is introduced through the passageway 54 (FIGS. 6 and 10) from a source of supply which is connected to the pilot valve assembly 58 at an inlet port 68. The flow of air into the pilot valve assembly 58 is controlled by the positioning of a throttle valve 69 (See FIG. 7).

The two chambers 66 and 67 communicate with lateral passages 64 and 65 which in turn communicate with the ports 62 and 63. The air after passing the throttle valve 69 is supplied to the passage 54 in the base of the upper housing 10. When the opening 40 is closed off, a back pressure is created in the passageway 57 which in turn is in communication with a passageway 70 in the pilot valve assembly 58. The passageway 70 opens into a chamber 71 within which the spool valve piston is moveable. The spool valve is normally biased toward the right as viewed in FIG. 8 by the introduction of constant pressure oil to the pilot valve assembly 58 through an inlet port 72. The constant pressure oil which is introduced at this port 72 bypasses a throttle valve 73 and enters a closed passageway 74. The passageway 74 is intersected by a cylindrical opening 75 which is in axial alignment with the spool valve 59 and located at the end of the spool opposite the piston portion. The cylindrical opening 75 has received therein a piston-like member 76 which has its inner end in abutting relationship with one end of the spool valve 59 and its other end exposed to the constant pressure oil present within the passageway 74 thus providing in effect, a fluid spring which biases the spool valve 59 toward the right as viewed in FIG. 8. Thus it can be seen that whenever the back pressure created in the position sensing element 38 and reflected as pressure within the chamber 71 is great enough to overcome the bias of the constant pressure on the piston-like member 76, the spool valve 59 will move to the left to the position shown. The throttle valve 73 controls the flow of constant pressure oil to the passageway 50 which is connected at its upper end to the passage 72a formed within the pilot valve assembly 58.

Thus it can be seen from FIG. 8 that constant pressure oil in inlet port 72 will be controlled by throttle valve 73 as it flows to the passage 72a. Also positioned within the pilot valve assembly is a check valve 77 which serves as a bypass around spool valve 59 when the inlet passageway 61 is connected to exhaust.

Referring now to FIG. 10 there is shown a schematic diagram for operating the stop and lock mechanism of the invention. The upper housing 10 is shown in plan view with its cover removed. Within the housing 10 a cam drum 78 is mounted for rotation about a vertical axis 79. The drum 78 has a ring gear 80 positioned therein in cooperating relationship with a drive gear 81. The drive gear 81 is adapted to be rotated by a constant speed motor thus rotating the cam drum 78 at a preselected constant speed. The external surface of the cam drum 78 is provided with a plurality of cam elements of which two, 82 and 83, are shown. As the cam elements 82 and 83 are moved by the cam drum 78, they will successively contact rollers 84 and 85 which are mounted adjacent the opposite ends of a pivoted valve actuating lever 86. The lever 86 is pivotally supported at 87 and is provided with stop surfaces 88. In the position shown in FIG. 10, the cam 82 is in contact with the rollers 84 and the valve actuating lever 86 has been rotated counter-clockwise. The opposite end of the valve actuating lever 86 is provided with a pivotal connection with one end of an axially reciprocable spool valve 89. The spool valve 89 is adapted to slide within the chambered valve block 90. The valve block 90 is provided with a chamber 91 in which oil under pressure is maintained. The two other chambers 92 and 93 are provided in the valve block 90 and serve as exhaust chambers which are connected to atmospheric pressure. The particular valve block 90 which is shown on FIG. 10 actually has numerous spool valves slidably received therein, but for the purpose of illustrating this invention, only the spool valve 89 which is utilized to control the introduction of pressure fluid to the stop and lock mechanism is disclosed.

The spool valve 89 has an undercut portion 94 which serves to allow flow of oil under pressure from the chamber 91 through a pipe 95 to the inlet passage 61 of the pilot valve assembly 58 or the exhaust of oil under pressure from the inlet passage 61 to the exhaust chamber 93. This alternate connection is carried out by the axial shifting of the spool valve 89 through the valve actuating lever 86. It should be pointed out that the cam 82, as it continues to move to the right, will pass above the roller 85 and that the cam 83 which is vertically below the path of travel of the cam 82 will contact the roller 85 and result in rocking the lever 86. This rocking of the lever 86 will move the spool valve 89 to its alternate position wherein the pipe 95 will be connected to the exhaust chamber 93. Thus it can be seen that the valve 89 will be shifted to alternately connect the pipe 95 to the pressure source or to exhaust once during each revolution of the cam drum 78.

When the spool valve 89 is in the position shown in FIG. 10, oil under pressure is fed through the pipe 95 to the passageway 61 and flows to the upper end of the piston 46, thus forcing the piston 46 downward to the position shown. As the piston 46 moves downward the position sensing element 38 will be moved below the bottom surface of the main stop and lock mechanism casting 32. The turret 11, which will be moving in the direction of the arrow shown thereon, will carry the stop block 41 into the position shown where the block will seal off the side opening and prevent air from bleeding out of the opening. The air which is supplied to the bleeder opening 40 is fed thereto from a source of constant pressure through the inlet port 68, past a throttle valve 69, through a passageway 54 and thence downward through the tubular element 56 which is connected to the upper end of the position sensing element 38. As the air pressure builds up due to the closing of the port 40, this pressure will be transmitted through the passageway 57 to the chamber 71 in which the piston portion of the spool valve 59 is positioned. When this pressure has built up to a preset amount, the spool valve 59 will be shifted upward as viewed in FIG. 10, thus allowing the oil under pressure within the passageway 61 and chamber 67 to pass into the annular chamber 66 and out through the port 64 and thence through the passageway 62 connected to the upper end of the chamber within which piston 45 is adapted to slide. This will cause the piston 45 and the locking member 39 to move downward from the position shown in full lines to the position shown in dotted lines wherein the lower end of the locking member 39 will engage the rear face of the stop block 41. As can be seen from viewing FIGS. 4 and 10, the lower end of the locking member 39 has a beveled surface 96 which will abut a cooperating beveled surface 97 formed on the rear face of the stop lock 41.

The amount of air pressure required to shift the spool valve 59 is controlled by the constant pressure oil supplied to the passageway 74 through the inlet port 72.

The oil pressure within the passageway 74 forces the piston-like member 76 against the spool valve 59 in opposing relationship with respect to the air pressure applied thereto. The same source of constant pressure oil is also fed through the control valve 73 and passageway 50 to the underside of the pistons 48 and 49. Thus when the pistons 45 and 46 are actuated to move the sensing element 38 and the locking member 39 downward into engagement with the stop block 41, the pistons 48 and 49 also will be moved downward at a rate which is controlled by the setting of the throttle valve 73. Thus the speed with which the sensing member and the locking member are moved downward may be controlled.

The above description shows the sequence of operation of the sensing element and the locking member. When the main control valve 89 is shifted by the cam 93 to its opposite position, the pipe 95 will be connected to the exhaust chamber 93 with the result that the oil above the pistons 45 and 46 will be exhausted. The pistons 45 and 46, when the pressure has been removed therefrom, will move upward together under the influence of the constant pressure oil being fed below the pistons 48 and 49. It must be realized that as soon as the port 40 has been moved up a sufficient amount to clear the stop block 41, air again will begin to bleed therethrough and the valve 59 will move to the position shown in FIG. 10. However, oil which is present in the system above the piston 45 will exhaust from the chamber 66 through the check valve 77 and the oil in the area above the piston 46 will exhaust through the passageways 61 and 63. In order to prevent excessive loss of air, the tubular element 56 which will move up with the sensing element 38, telescopes into the chamber 55 and as previously described, will effectively cut off the air inlet passage 54. Air will again be fed through the bleeder opening 40 as soon as the tubular element 56 is again moved downward by the downward movement of the sensing element 38.

Because of the fact that the other operations of the machine, for example, the operation of the blow head, must be delayed until the locking member 39 has begun its downward movement, the feeding of oil to the piston 16 for moving the blow heads down is initiated by the presence of oil pressure in the line 98. This pressure within line 98, while not actually being used to move the pistons 14 downward, is utilized to operate a valve (not shown) which in turn controls the introduction of pressure fluid to the pistons 16. Thus it can be seen that there is an inter-connection between the locking mechanism and the blow station of the machine.

While the above description has been primarily directed toward the locking mechanism for locking the turret of a glass forming machine, it can readily be seen that the stop and lock mechanism above described is capable of use as a position sensing and locking device for any moving member which it is desired to accurately position and lock at such position. Furthermore, the utility of this stop and lock mechanism for application to other mechanisms is apparent and obvious. Its utility in the glass forming machine type having an indexible neck mold carrying turret has been set forth above in detail.

As previously pointed out it was advantageous to be able to stop the neck mold carrying turret at specific locations in order to insure that the forming operations carried out by the machine will be done with precision and accuracy at each of the forming stations.

Various modifications may be resorted to within the spirit and scope of the appended claims.

We claim:

1. In a glass forming machine of the type having an indexing turret, a turret registering and locking device comprising a stop-block carried by said turret, a housing for supporting said turret, means carried by said housing and movable into and out of the path of movement of said stop block for sensing the approach of said stop-block to a predetermined position, a locking member shiftable into engagement with said stop block, means responsive to movement of said stop block into close proximity to said sensing means, for shifting said locking member, whereby said turret is locked in said predetermined position.

2. The apparatus defined in claim 1 wherein said sensing means comprises a vertically shiftable air bleeder nozzle having its bleed opening movable into the path of travel of said stop block.

3. The apparatus defined in claim 2 wherein said responsive means comprises a pilot valve shiftable by a predetermined pressure buildup in said sensing means.

4. The apparatus defined in claim 3 wherein said lock means comprises a vertically moveable member engageable with said stop block, said member being hydraulically shiftable downward in response to actuation of said pilot valve.

5. The apparatus defined in claim 4 wherein said bleeder nozzle is a rigid member that engages the stop block at a point laterally removed from the engagement thereof by said vertically moveable member.

6. Apparatus for registering and locking an intermittently driven moving machine part at a predetermined position comprising stop means carried by said machine part and moveable therewith, means at said position for sensing the movement of said stop means into said position, and means operated in response to said sensing means for engaging said stop means to lock said machine part in said predetermined position.

7. In a glass forming machine of the type having an indexing turret, a turret registering and locking device, comprising a stop-block carried by said turret, a housing for supporting said turret, a vertically shiftable locking device carried by said housing, a vertically shiftable stop rod carried by said housing for sensing the approach of said stop-block to a predetermined position, means for moving said stop rod into the path of said stop-block, said stop rod further comprising a hollow member having a side opening port therein, said port facing opposite to the direction of movement of said stop-block, means for bleeding air through said rod, and means responsive to buildup of pressure in said rod for shifting said locking device into engagement with said stop-block whereby said turret is locked in said predetermined position.

8. Apparatus as defined in claim 7 further including motor driven timing means for simultaneously retracting both said sensing head and said lock after a predetermined time interval.

9. Apparatus as defined in claim 8 further including means for shutting off the air supply to said stop-rod while in fully retracted position.

10. In a glass forming machine of the type having an indexing turret, a turret registering and locking mechanism comprising a stop member mounted on said turret, an upper machine housing supporting said turret for indexing movement, a stop member engaging device mounted on said housing, a stop member position sensing element mounted on said housing, means connected to said engaging device for shifting said device into and out of engagement with said stop member, means connected to said position sensing element for moving said element into and out of the path of movement of said stop member, and means connecting said sensing element to said means for shifting said engaging device whereby said engaging device is shifted into engagement with said stop member when said stop member is positioned in predetermined proximity to said sensing element.

11. The apparatus as defined in claim 10 wherein said position sensing element comprises an air bleeder nozzle having its bleed opening facing in the direction opposite to the direction of movement of said stop member and adapted to be closed off by movement of said stop member into close proximity therewith.

12. The apparatus as defined in claim 10 wherein said means for shifting said engaging member comprises a reciprocating fluid motor connected thereto.

13. The apparatus as defined in claim 12 wherein said connecting means comprises a pilot valve connected to said bleeder nozzle and shiftable upon closing of said bleeder nozzle to pass fluid under pressure to said fluid motor for shifting said engaging member into engagement with said stop member.

References Cited in the file of this patent
UNITED STATES PATENTS

| | | |
|---|---|---|
| 2,336,162 | Bridges | Dec. 7, 1943 |
| 2,531,890 | Pearson | Nov. 28, 1950 |
| 2,649,660 | Ochwat | Aug. 25, 1953 |
| 2,773,617 | Weiss | Dec. 11, 1956 |
| 2,788,150 | Rose | Apr. 9, 1957 |
| 3,048,590 | Cross | Aug. 7, 1962 |